(No Model.)
P. GENDRON.
ELASTIC TIRE.
No. 466,822. Patented Jan. 12, 1892.
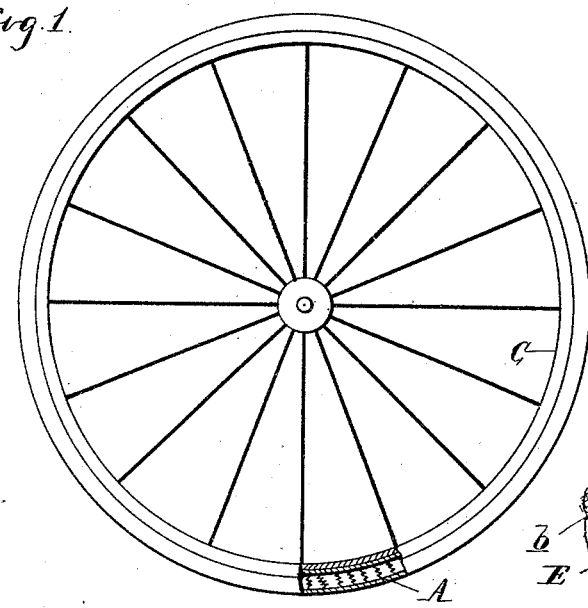
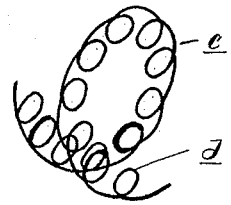
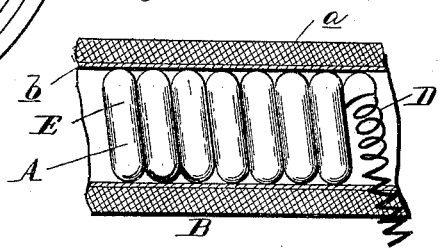
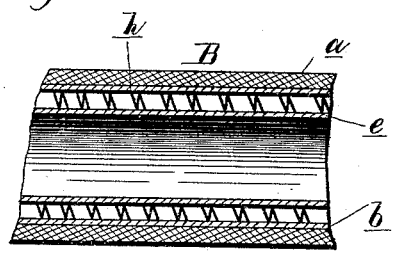
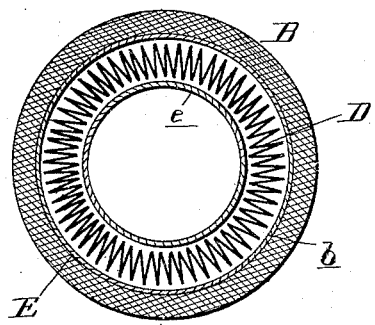
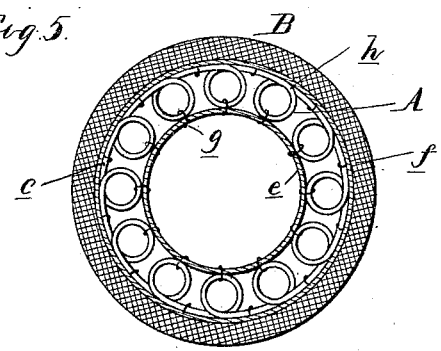
Witnesses
*[signatures]*
Inventor
Peter Gendron
By *[signature]*
Attys.

UNITED STATES PATENT OFFICE.

PETER GENDRON, OF TOLEDO, OHIO, ASSIGNOR TO THE GENDRON IRON WHEEL COMPANY, OF SAME PLACE.

ELASTIC TIRE.

SPECIFICATION forming part of Letters Patent No. 466,822, dated January 12, 1892.

Application filed April 9, 1891. Serial No. 388,328. (No model.)

*To all whom it may concern:*

Be it known that I, PETER GENDRON, a citizen of the United States, residing at Toledo, in the county of Lucas and State of Ohio, have invented certain new and useful Improvements in Elastic Tires, of which the following is a specification, reference being had therein to the accompanying drawings.

This invention relates to new and useful improvements in elastic tires; and the invention consists in the peculiar construction of a spring-tire surrounded by a tubular casing of rubber or other material.

The invention further consists in the peculiar construction, arrangement, and combination of the various parts, all as more fully hereinafter described and claimed.

In the drawings, Figure 1 is a side elevation of a wheel to which my invention is applied.
Fig. 2 is a detached section of a portion of the tire, showing the spring in elevation. Fig. 3 is a vertical cross-section of Fig. 2. Fig. 4 is a similar section to Fig. 2, showing a different form of spring. Fig. 5 is a vertical cross-section of Fig. 4. Fig. 6 is a detached perspective view of the spring shown in Figs. 4 and 5.

In the present state of the art pneumatic tires composed of rubber or other elastic tube are used on bicycles and give quite satisfactory results. Such pneumatic tires have a serious objection in the fact that as soon as they become punctured their value is destroyed. Their use is therefore restricted to places where the road is perfectly smooth and even and free from obstacles, such as stones, &c., which very soon cut through.

My invention is intended to give a tire with all of the elasticity of the pneumatic tire, but without its disadvantages. To this end I form an inner tire A of a spring in any suitable manner, and around this I place a casing or tube B, which is secured as may be desired to the rim C of the wheel. It is evident that if the casing B is a so-called "pneumatic tire," when reinforced by a spring, such as A, should it become punctured it will still retain its elasticity, the spring giving the necessary reinforcement to the casing. This reinforcement or spring tire I preferably form, as shown in Figs. 1 and 2, of a spiral spring D, spirally arranged within the tube and covered with a casing C. The spring may be arranged within the tube loosely or by securing each spirally to the inside of the tube, so that a depression at one point in the tire will allow the different coils of the tire to move independently of the adjacent coils, or the coils may be connected together to reinforce each other. I preferably arrange them with the coils capable of independent movement, as I obtain more perfect elasticity.

If desired, the casing E may be omitted and the coil secured directly to the interior of the tube.

I preferably construct the tire of a rubber portion *a* and the canvas portion *b*. Instead of forming this reinforcing-spring as shown in Figs. 1, 2, and 3, I may form it as shown in Figs. 4, 5, and 6, in which it is shown to consist of a single wire *c*, bent to have a series of loops *d*, and spirally arranged within the tube. Within this spring-tire I have shown an inner lining or casing *e*. This, however, is not necessary, and may be omitted, if desired. I preferably secure this form of spring at the points *f* intermediate the loops, and if the interior casing is used at the points *g*. This allows the movement of the parts of the spring upon itself at *h*, where the two parts of the spring cross each other in forming the loop and brings no strain upon the point of attachment.

What I claim as my invention is—

1. The combination, with a tubular tire, of an interior looped reinforcing-spring, substantially as described.

2. The combination, with a tubular tire, of an interior looped reinforcing-spring spirally arranged, substantially as described.

3. The combination, with an elastic tubular tire, of an interior reinforcing spiral spring spirally arranged, substantially as described.

4. The combination, with an elastic tubular tire, of an interior looped reinforcing-spring spirally arranged, having its coils capable of independent movement, substantially as described.

5. The combination, with an elastic tubular tire composed of the rubber portions $a$ and canvas portion $b$, of the spiral spring $d$, spirally arranged within said tire, and a covering E for said spring, substantially as described.

In testimony whereof I affix my signature in presence of two witnesses.

PETER GENDRON.

Witnesses:
  N. L. LINDOP,
  M. B. O'DOGHERTY.